United States Patent
Ta et al.

(10) Patent No.: US 8,075,439 B2
(45) Date of Patent: Dec. 13, 2011

(54) AUTOMATIC OPENING-CLOSING DEVICE

(75) Inventors: Jingning Ta, Hong Kong (CN);
Zhiqiang Wu, Shenzhen (CN); Jicheng Pan, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 403 days.

(21) Appl. No.: 12/356,949

(22) Filed: Jan. 21, 2009

(65) Prior Publication Data

US 2009/0186736 A1    Jul. 23, 2009

(30) Foreign Application Priority Data

Jan. 18, 2008  (CN) .................. 2008 1 0065084

(51) Int. Cl.
*F16H 35/10* (2006.01)
*F16D 7/02* (2006.01)

(52) U.S. Cl. .............. 475/263; 192/56.1; 464/30

(58) Field of Classification Search .......... 4/246.1; 74/10.85, 425, 458, 801; 464/41, 42, 43, 464/45, 46, 30; 475/149, 150, 252–269, 475/331, 337, 338–342, 347, 903; 192/56.1, 192/56.6
See application file for complete search history.

(56) References Cited

U.S. PATENT DOCUMENTS

| | | | | | |
|---|---|---|---|---|---|
| 2,655,015 | A | * | 10/1953 | Linder | 464/31 |
| 3,091,951 | A | * | 6/1963 | Onyskin | 464/30 |
| 3,105,371 | A | * | 10/1963 | Forrest | 464/46 |
| 3,180,113 | A | * | 4/1965 | Onyskin | 464/46 |
| 3,648,483 | A | * | 3/1972 | Garcia, Jr. | 464/43 |
| 3,942,337 | A | * | 3/1976 | Leonard et al. | 464/36 |
| 4,728,053 | A | * | 3/1988 | Hitomi | 242/246 |
| 4,883,152 | A | * | 11/1989 | Froment | 192/42 |
| 5,383,818 | A | * | 1/1995 | Lessat-Kaupat et al. | 464/36 |
| 5,700,196 | A | * | 12/1997 | Banemann et al. | 464/36 |
| 6,056,101 | A | * | 5/2000 | Kataoka | 192/150 |
| 7,465,248 | B2 | * | 12/2008 | Katoh et al. | 475/264 |
| 7,628,727 | B2 | * | 12/2009 | Nagai et al. | 475/291 |
| 2003/0011907 | A1 | * | 1/2003 | Yamauchi et al. | 359/872 |
| 2005/0046290 | A1 | * | 3/2005 | Baukholt et al. | 310/75 R |
| 2005/0217010 | A1 | * | 10/2005 | Hayashi et al. | 4/246.1 |
| 2008/0271231 | A1 | * | 11/2008 | Stauber et al. | 4/246.1 |

* cited by examiner

*Primary Examiner* — Roger Pang
*Assistant Examiner* — Michael Gonzalez
(74) *Attorney, Agent, or Firm* — Muncy, Geissler, Olds & Lowe, PLLC

(57) ABSTRACT

An automatic opening-closing device, especially for a cover or seat of a toilet, has a motor having a motor shaft, a speed reducer connected to the motor shaft, a planetary gearbox driven by the speed reducer, an output axle for driving the cover between an open position and a closed position. A protection device limits the torque between the output axle and an output shaft of the planetary gearbox.

21 Claims, 3 Drawing Sheets

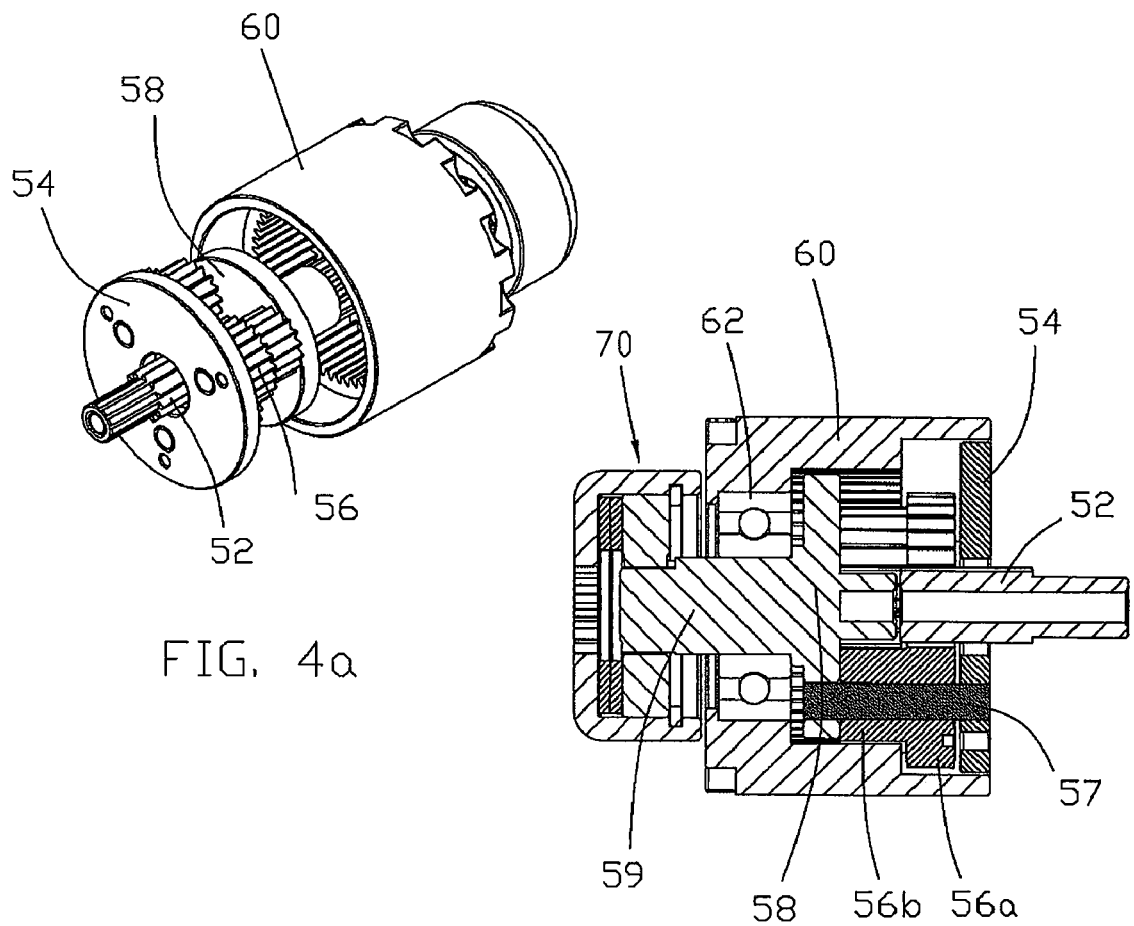
FIG. 4a
FIG. 4b
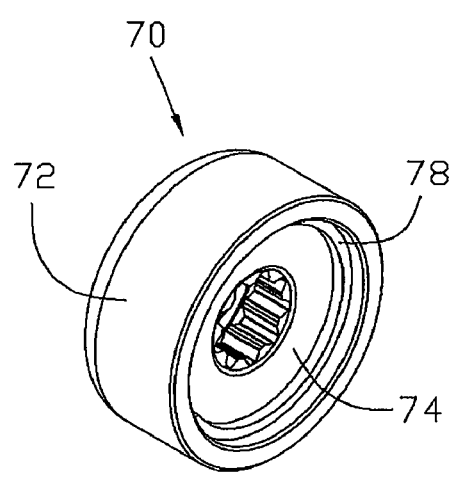
FIG. 5a
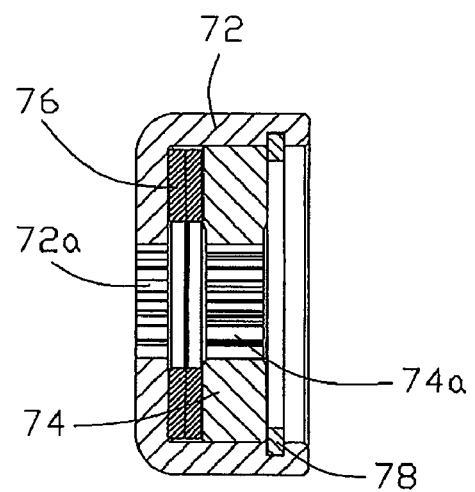
FIG. 5b

AUTOMATIC OPENING-CLOSING DEVICE

CROSS REFERENCE TO RELATED APPLICATIONS

This non-provisional patent application claims priority under 35 U.S.C. §119(a) from Patent Application No. 200810065084.1 filed in The People's Republic of China on Jan. 18, 2008.

FIELD OF THE INVENTION

The present invention relates to a motor drive unit and in particular to a motor drive unit for an automatic opening-closing device for a toilet.

BACKGROUND OF THE INVENTION

Traditional toilets require a user to directly contact the lids and seats of the toilets to open or close the toilet. This is neither convenient nor sanitary.

To solve the above mentioned problems, designers have developed automatic opening-closing devices which do not need the user to make direct contact with lids and seats of the toilet. A typical automatic opening-closing device for a toilet comprises a driving motor, a shaft capable of pivoting the seat or the lid of the toilet, and a speed reduction gear box connected between the motor and the shaft. However, in currently available automatic opening-closing devices, the reduction gear box is easily damaged when an excessive load is applied to the seat or lid. Moreover, because the existing opening-closing devices generally adopt a NGW planetary gear having a comparatively small gear ratio to reduce the speed of the output shaft, a speed reduction system with comparatively many stages is needed.

SUMMARY OF THE INVENTION

Hence there is a desire for a drive unit for an automatic opening-closing device which can be manually operated without damaging the gear train.

Accordingly, in one aspect thereof, the present invention provides an automatic opening-closing device comprising: a motor having a shaft; a speed reducer connected to the shaft; a planetary gearbox having a sun gear driven by the speed reducer; an output axle for driving a member between a first position and a second position; and a protection device having a driven ring and a driving ring, wherein one end of the output axle is secured to the driven ring and an output shaft of the planetary gearbox is secured to the driving ring, whereby the output shaft drives the output axle via the protection device, so as to drive the member.

Preferably, the protection device is a friction clutch, the driving ring and the driven ring comprising an inner ring and an outer ring, the outer ring having a wall at one axial end and the inner ring being disposed within the outer ring, the clutch having at least one spring disc located between axial end faces of the wall of the outer ring and the inner ring, and a circlip holding the inner ring inside the outer ring against the urgings of the spring disc; such that the inner ring and outer ring rotate together unless acted upon by a force greater than a predetermined maximum.

Preferably, the planetary gearbox comprises multiple duplex planet gears; each planet gear comprising a first segment and a second segment, and the tooth number of the first segment is different from the tooth number of the second segment.

Preferably, the tooth number of the first segment is more than the tooth number of the second segment; the planetary gearbox has an internal gear which is in mesh with the second segment of each planet gear and the sun gear is in mesh with the first segment of each planet gear.

Preferably, the planetary gearbox comprises a carrier rotatably fixed within the internal gear, and each planet gear is rotatably mounted to the carrier by a planet gear shaft; the output shaft extends out of the internal gear from the carrier and rotates with the carrier.

Preferably, the output shaft is rotatably mounted to an inner wall of the internal gear via a bearing.

Preferably, the planetary gearbox further comprises a cover plate, and the planet gears are mounted between the cover plate and the carrier by the planet gear shafts.

Preferably, the speed reducer, the planetary gearbox and the protection device are contained within a housing and a torsion spring surrounds the output axle with one end thereof fixed to the output axle or to the member and the other end fixed to the housing; whereby when the member is in a first position, the torsion spring is in a deformed state and arranged to urge the member towards the second position.

Preferably, a position sensor is mounted at one end of the motor; a magnet is mounted to one end of the motor shaft adjacent to the position sensor, the position sensor being arranged to produce voltage signals in response to the rotation of the motor shaft.

Preferably, there are two position sensors circumferentially spaced about the motor shaft and producing signals in response to the rotation of the motor shaft but having a phase difference, the phase difference being indicative of the direction of rotation of the motor shaft.

Preferably, the speed reducer comprises two pairs of worm and worm gear; wherein, the worm of one pair of worm and worm gear is fixed to the motor shaft, and the worm gear of the other pair of worm and worm gear is fixed to the sun gear.

Preferably, the planetary gearbox is a NW planetary gearbox.

Advantages of embodiments of the present invention include preventing damage to the gear train of the device when an excessive load is placed on the output shaft, such as when the lid or seat is forcefully moved by an external force or by the motor trying to drive the seat or lid which is blocked or already at the end of the range of movement. This allows a user to move the seat or lid by hand should the need arise such as during a power failure.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

FIG. 4a is a partially exploded view of a planetary gear box, being a part of the drive unit of FIG. 1;

FIG. 4b is a sectional view of the planetary gear box of FIG. 4a;

FIG. 5a is an isometric view of a protection device being a part of the drive device of FIG. 1; and FIG. 5b is a sectional view of the protection device of FIG. 5a.

DESCRIPTION OF THE PREFERRED EMBODIMENT

Figure 1:
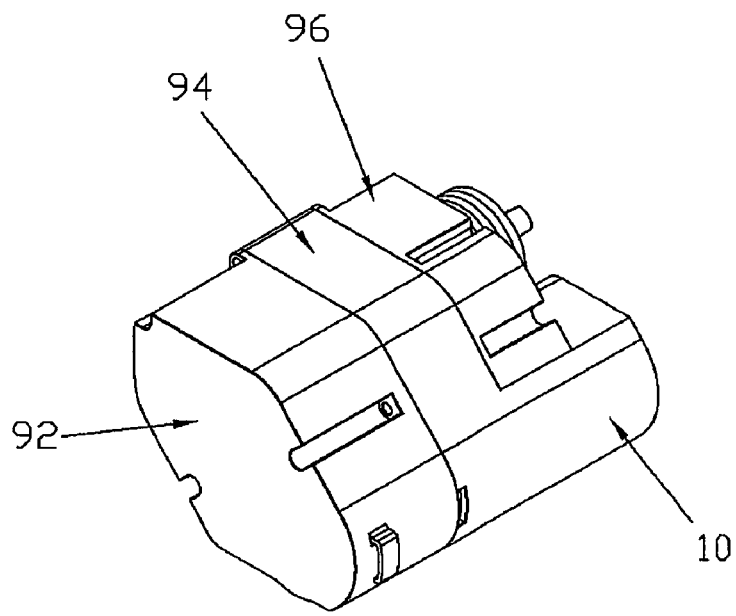
FIG. 1 is an isometric view of a motor drive unit of an automatic opening-closing device according to an embodiment of the present invention.
Figure 2:
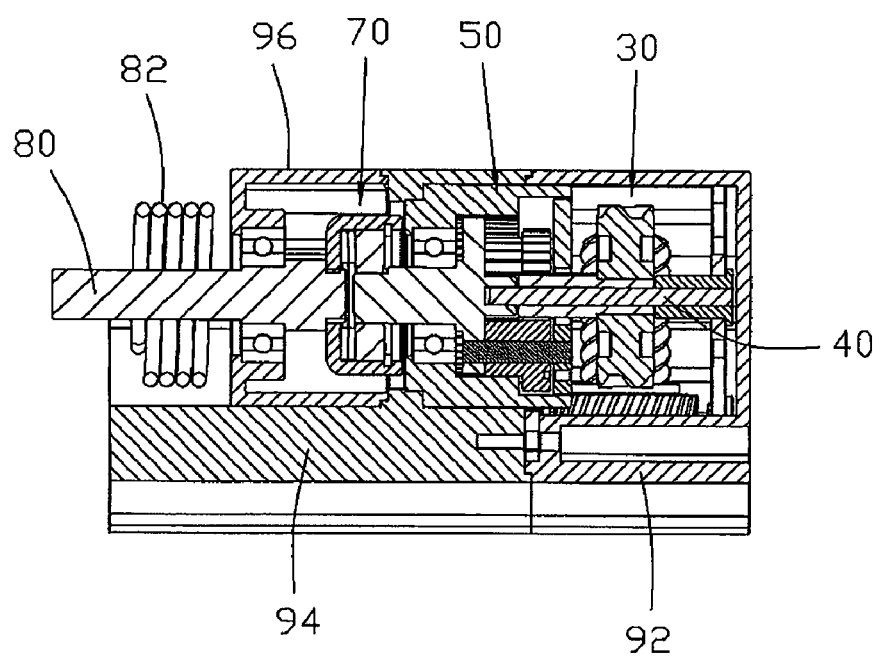
FIG. 2 is a sectional view of the drive unit of FIG. 1.

FIG. 1 and FIG. 2 are schematic diagrams of a motor drive unit for an automatic opening-closing device according to the preferred embodiment of the present invention. The automatic opening-closing device can be used with toilets or other applications using a pivotable or rotatable member such as the cover or seat. The present description will use a toilet as an example to explain the invention.

The drive unit comprises a motor 10, a speed reducer 30, a NW planetary gearbox 50, a protection device 70, an output axle 80, and a housing. The housing comprises a first housing part 92 for the speed reducer 30, a second housing part 94 for the planetary gear box 50, and a third housing part 96 for the protection device 70. One end of the output axle 80 is contained in the third housing part 96 and connected to the protection device 70, and the other end extends out of the housing to be connected to the upper cover or seat of the toilet (not shown in the figures) so as to move the upper cover or seat between the open and closed positions. A torsion spring 82 assists rotation of the output axle 80. One end of the torsion spring 82 is fixed to the output axle 80, for example by having a end portion bent radially inwardly and passing through a hole in the axle, and the other end is fixed to the third housing part 96. When the upper cover or seat of the toilet is located at a desired angle setting such as 70 degrees, the torsion spring 82 is at the original or relaxed state. When the upper cover or seat of the toilet is located at a position more than or less than the setting angle, the torsion spring 82 will be at the deformation state, having the tendency to push back the upper cover or seat of the toilet to the setting angle. It is to be understood that one end of the torsion spring 82 could be directly connected to the upper cover or seat of the toilet, and the other end could be fixed to other parts of the housing.

Figure 3A:
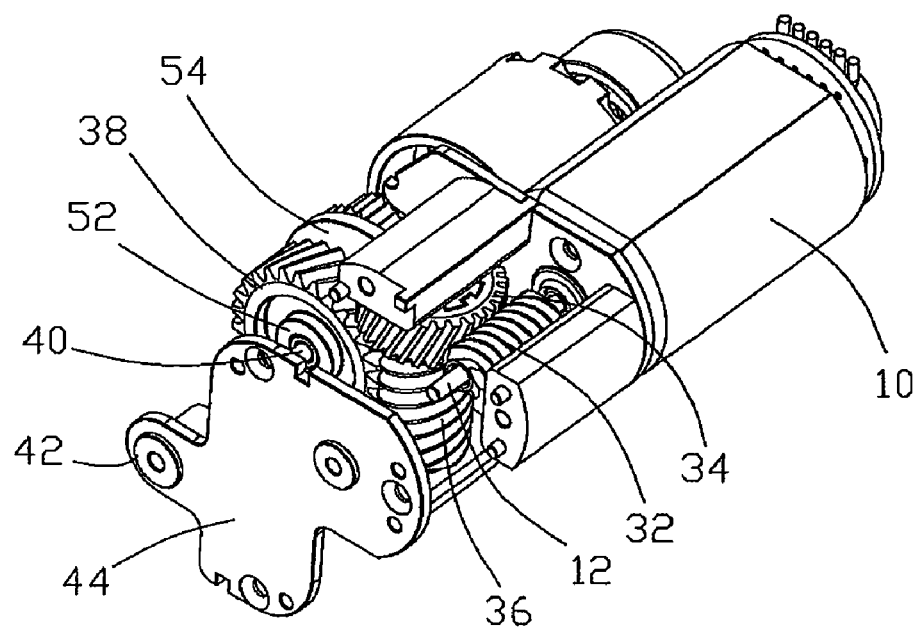
FIG. 3a is a partially exploded view of the motor drive unit of FIG. 1, with a cover removed.
Figure 3B:
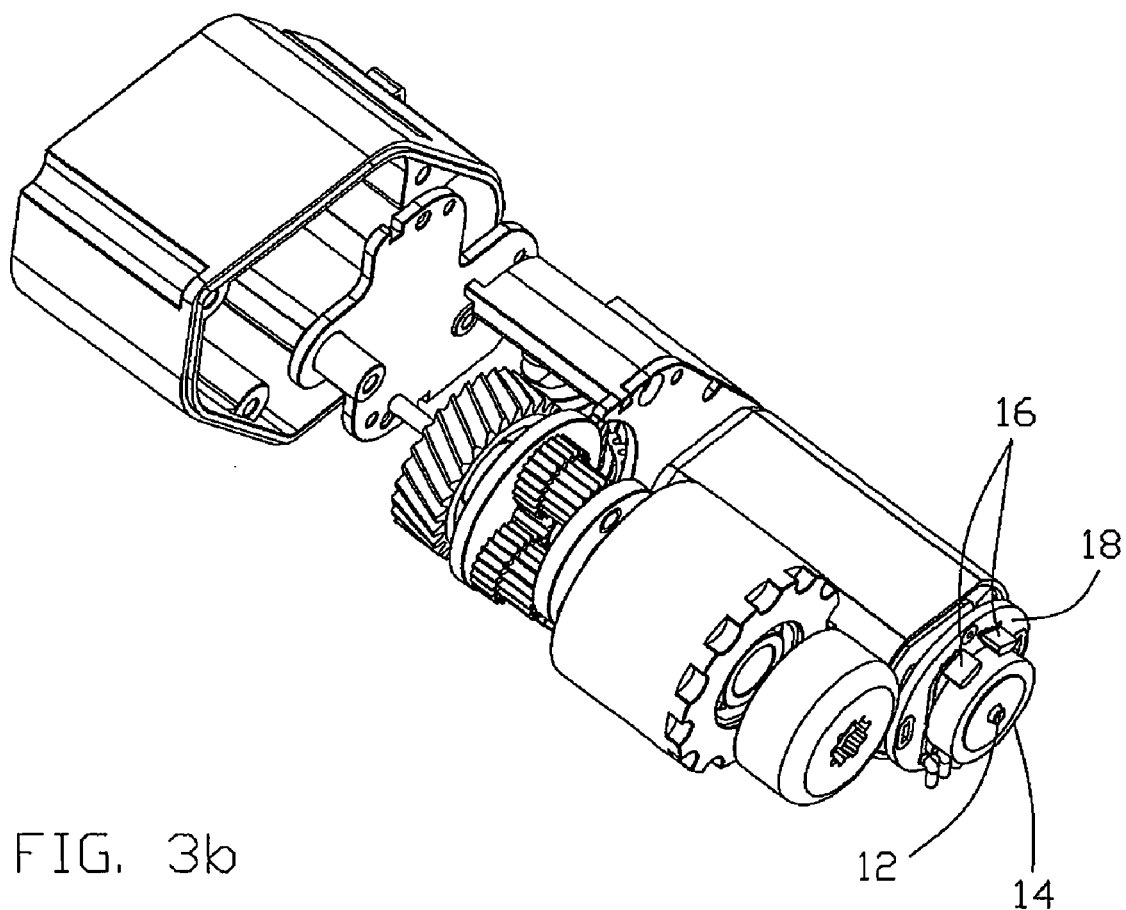
FIG. 3b is a partially exploded view of the drive unit from a different angle.

Referring to FIG. 3a and FIG. 3b, the motor 10 comprises a shaft 12, a ring magnet 14 fixed to an outer end of the shaft 12, position sensitive detectors 16 being fixed to a circuit board 18 at the end of the motor 10 and adjacent to the magnet 14. Preferably, the position sensitive detectors are Hall sensors which co-operate with the ring magnet 14 to produce a high and low voltage signal indicative of the rotation of the motor shaft. A microprocessor (not shown) associated with the toilet uses this signal to determine the opening angle of the upper cover or seat of the toilet. Two Hall sensors are provided to determine the direction of rotation of the motor which corresponds to the direction the cover or seat is moving.

The speed reducer 30 comprises a first worm 32, a first worm gear 34, a second worm 36, and a second worm gear 38. The first worm 32 is fixed to the shaft 12 of the motor 10 and rotates with the shaft 12. The first worm gear 34 is meshed with the first worm 32. The second worm 36 and the first worm gear 34 are fixed to the same rotating shaft so as to rotate together. The second worm gear 38 is meshed with the second worm 36. The second worm gear 38 is rotatably mounted to a stationary shaft 40, and the stationary shaft 40 is fixed to a support plate 44 via a bearing 42. The support plate 44 is fixed to the case of the motor 10. The first worm 32 and the second worm 36 adopt a comparatively large helix angle, so as to avoid self-locking between the worm gears and worms.

Referring to FIG. 4a and FIG. 4b, the NW planetary gearbox 50 comprises a sun gear 52, a planet gear cover plate 54, multiple duplex planet gears 56, a carrier 58, and an internal gear 60. The sun gear 52 is fixed within a central hole of the second worm gear 38 so as to rotate with the second worm gear 38. In the present embodiment, there are three planet gears 56, and each planet gear 56 is rotatably connected to the planet gear cover plate 54 and the carrier 58 via a planet gear shaft 57. One end of each planet gear shaft 57 is fixed to the carrier 58, and the other end is fixed to the planet gear cover plate 54. The assembly of the carrier 58, the planet gears 56 and the planet gear cover plate 54 is fitted to the internal gear 60. One side of the carrier 58 is integrated with a output shaft 59. The output shaft 59 is connected to an inner wall of the internal gear 60 via a bearing 62 with the end of the output shaft 59 extending out of the internal gear 60. Each planet gear 56 comprises a first segment 56a and a segment 56b; the first segment 56a is meshed with the sun gear 52, and the second segment 56b is meshed with the teeth of the internal gear 60; the tooth number of the first segment 56a is more than the tooth number of the second segment 56b, so that the NW planetary gearbox has a comparatively large gear ratio.

Referring to FIG. 5a and FIG. 5b, the preferred protection device 70 is a friction clutch, comprising an outer ring 72, an inner ring 74, two elastic spring discs 76 and an elastic locating ring or circlip 78. The center of the outer ring 72 is provided with a hole 72a, and one end of the output axle 80 is fixed in the hole 72a of the outer ring 72 by a spline connection. The center of the inner ring 74 is also provided with a hole 74a and the end of the output shaft 59 is fixed in the hole 74a of the inner ring 74 by a spline connection. The inner ring 74, the spring discs 76 and the circlip 78 are all contained within the outer ring 72. The spring discs 76 are located between a closed axial end face of the outer ring 72 and the inner ring 74. The circlip 78 is located at the outer end of the inner ring 74 and holds the inner ring 74 within the outer ring 72 against the urgings of the spring discs 76 so a comparatively big static friction can be produced between the inner ring 74 and the outer ring 72, through the circlip 78 and the spring discs 76 to make the outer ring 72 rotate with the inner ring 74. In use, the clutch will slip if the forces across the clutch, ie, between the output shaft 59 and the output axle 80 exceed a predetermined value, protecting the motor and gears from overload. In the present embodiment, the spring discs 76 are Belleville springs.

In use, the motor shaft 12 drives the first worm gear 34 to rotate via the first worm 32; the first worm gear 34 drives the second worm gear 38 to rotate via the second worm 36; the second worm gear 38 rotates the sun gear 52 to drive the planet gears 56; the planet gears 56 rotate around the planet gear shafts 57 and simultaneously roll along the teeth of the internal gear 60, so as to rotate the carrier 58; the carrier 58 drives the output axle 80 via the clutch 70, so as to move the cover or seat of the toilet up or down. When the microprocessor (not shown) of the toilet determines that the opening angle of the upper cover or seat of the toilet has reached a preset angle such as 110 degrees by processing the signal produced by the Hall sensors 16, the motor is turned off, and the cover or seat of the toilet can stop at the position of the scheduled opening angle.

In the automatic opening-closing device for a toilet of the present invention, the protection device 70 of the motor drive unit protects the gear train especially the gears of the speed reducer from damage should the drive unit encounter an overload situation. An overload situation may occur, for example, when the cover or seat is manually moved or when the cover or seat is blocked when the drive unit is trying to operate. In such a situation should the torque developed across the protection device between the output axle 80 and the output shaft 59 exceed the preset maximum, the protection device will allow slippage between the output axle and the output shaft preventing excessive torque being applied to the gears and the motor. Thus allowing the user, at their convenience, to manually open or close the cover or seat of the toilet as desired, even when a power failure occurs.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An automatic opening-closing device comprising: a motor having a shaft, a speed reducer connected to the shaft, a planetary gearbox having a sun gear driven by the speed reducer, and an output axle, and a protection device comprising a driven ring and a driving ring; wherein one end of the output axle is secured to the driven ring and an output shaft of the planetary gearbox is secured to the driving ring, whereby the output shaft drives the output axle to rotate between a first position and a second position via the protection device;

wherein the protection device is a friction clutch, the driving ring and the driven ring comprising an inner ring and an outer ring, the outer ring having a wall at one axial end and the inner ring being disposed within the outer ring, the friction clutch having at least one spring disc disposed within the outer ring and sandwiched between an axial end face of the wall of the outer ring and an axial end face of the inner ring, and a circlip holding the inner ring inside the outer ring against the urgings of the spring disc; such that the inner ring and outer ring rotate together unless acted upon by a force greater than a predetermined maximum.

2. The device of claim 1, wherein the planetary gearbox comprises multiple duplex planet gears; each planet gear comprising a first segment and a second segment, and the tooth number of the first segment is different from the tooth number of the second segment.

3. The device of claim 2, wherein the tooth number of the first segment is more than the tooth number of the second segment; wherein the planetary gearbox has an internal gear and wherein the sun gear is in mesh with the first segment of each planet gear, and teeth of the internal gear are in mesh with the second segment of each planet gear.

4. The device of claim 3, wherein the planetary gearbox comprises a carrier rotatably fixed within the internal gear, and each planet gear is rotatably mounted to the carrier by a planet gear shaft; the output shaft extends out of the internal gear from the carrier and rotates with the carrier.

5. The device of claim 3, wherein the output shaft is rotatably mounted to the internal gear via a bearing.

6. The device of claim 4, wherein the planetary gearbox further comprises a cover plate, and the planet gears are mounted between the cover plate and the carrier by the planet gear shafts.

7. The device of claim 1, wherein the speed reducer, the planetary gearbox and the protection device are contained within a housing, and a torsion spring surrounds the output axle with one end thereof fixed to the output axle and the other end fixed to the housing; whereby when the output axle is rotated to the first position, the torsion spring is in a deformed state and urges the output axle towards the second position.

8. The device of claim 1, wherein a position sensor is mounted at one end of the motor; a magnet is mounted to one end of the motor shaft adjacent to the position sensor; the position sensor being arranged to produce voltage signals in response to the rotation of the motor shaft.

9. The device of claim 8, wherein there are two position sensors circumferentially spaced about the motor shaft and producing signals in response to the rotation of the motor shaft but having a phase difference, the phase difference being indicative of the direction of rotation of the motor shaft.

10. The device of claim 1, wherein the speed reducer comprises two pairs of worm and worm gear; wherein, the worm of one pair of worm and worm gear is fixed to the motor shaft, and the worm gear of the other pair of worm and worm gear is fixed to the sun gear.

11. The device of claim 1, wherein the planetary gearbox is a NW planetary gearbox.

12. The device of claim 1, wherein two opposite sides of the spring disc directly contact the axial end face of the wall of the outer ring and the axial end face of the inner ring, respectively.

13. An automatic opening-closing device comprising:
a motor having a shaft;
a speed reducer connected to the shaft;
a planetary gearbox having a sun gear driven by the speed reducer, and an output shaft;
an output axle;
a protection device connected between the output shaft and the output axle whereby the output axle is driven by the output shaft via the protection device, the protection device comprising:
a driving ring to which the output shaft is secured, the driving ring being one of an outer ring and an inner ring disposed inside the outer ring;
a driven ring to which the output axle is secured, the driven ring being the other of the outer ring and the inner ring, the outer ring comprising an end wall with an axial end face facing an axial end face of the inner ring;
at least one spring disc disposed inside the outer ring and sandwiched between the axial end face of the inner ring and the axial end face of the end wall of the outer ring; and
a circlip disposed inside the outer ring, wherein the circlip holds the inner ring inside the outer ring against the urgings of the spring disc, such that the inner ring and outer ring rotate together unless acted upon by a force greater than a predetermined maximum.

14. The device of claim 13, wherein the planetary gearbox comprises multiple duplex planet gears; each planet gear comprising a first segment and a second segment, and the tooth number of the first segment is different from the tooth number of the second segment.

15. The device of claim 14, wherein the tooth number of the first segment is more than the tooth number of the second segment; wherein the planetary gearbox has an internal gear and wherein the sun gear is in mesh with the first segment of each planet gear, and teeth of the internal gear are in mesh with the second segment of each planet gear.

16. The device of claim 15, wherein the output shaft is rotatably mounted to the internal gear via a bearing.

17. The device of claim 13, wherein the speed reducer, the planetary gearbox and the protection device are contained within a housing, and a torsion spring surrounds the output axle with one end thereof fixed to the output axle and the other end fixed to the housing;
    whereby when the output axle is rotated to a first state, the torsion spring is in a deformed state and urges the output axle towards a second state.

18. The device of claim 13, wherein a position sensor is mounted at one end of the motor; a magnet is mounted to one end of the motor shaft adjacent to the position sensor; the position sensor being arranged to produce voltage signals in response to the rotation of the motor shaft.

19. The device of claim 18, wherein there are two position sensors circumferentially spaced about the motor shaft and producing signals in response to the rotation of the motor shaft but having a phase difference, the phase difference being indicative of the direction of rotation of the motor shaft.

20. The device of claim 13, wherein the speed reducer comprises two pairs of worm and worm gear; wherein, the worm of one pair of worm and worm gear is fixed to the motor shaft, and the worm gear of the other pair of worm and worm gear is fixed to the sun gear.

21. The device of claim 13, wherein two opposite sides of the spring disc directly contact the axial end face of the wall of the outer ring and the axial end face of the inner ring, respectively.

\* \* \* \* \*